United States Patent Office 3,113,943
Patented Dec. 10, 1963

3,113,943
TRIAZINE HYDROXY ETHERS
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,664
5 Claims. (Cl. 260—248)

This invention relates to nitrogenous hydroxy ethers and more particularly provides a new class of ether-substituted hydroxyaryltriazines.

According to the invention, there are provided new and valuable aromatic ether-substituted 2,4,6 - tris(monohydroxyaryl)-s-triazines by the reaction of certain 2,4,6-tris-(hydroxyhaloaryl)-s-triazines with alkali metal salts of phenols, substantially according to the scheme:

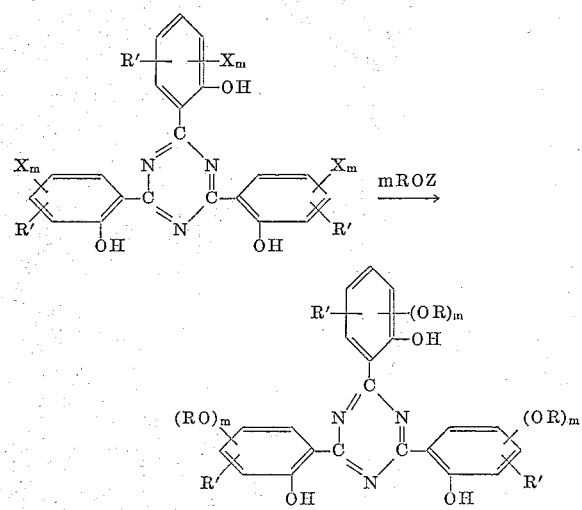

wherein R' is selected from the class consisting of hydrogen and alkyl radicals of from 1 to 5 carbon atoms, X is a halogen selected from the class consisting of chlorine, bromine and iodine, m is a number of from 1 to 2, R is selected from the class consisting of phenyl and phenoxyphenyl radicals and such radicals having an alkyl radical of from 1 to 5 carbon atoms substituted at a benzene ring, and Z is alkali metal.

The 2,4,6-tris(monohydroxyhaloaryl)-s-triazine starting materials are prepared, e.g., by trimerization of halo-substituted salicylonitrile or alkyl derivatives thereof. Thus, as reported by Lindemann, Ann. 449, 73, by heating 3,5-dibromosalicylonitrile above its melting point, there is obtained 2,4,6-tris(3,5 - dibromo-2-hydroxyphenyl)-s-triazine. They may also be prepared by halogenation of the tris(2-hydroxyphenyl)-s-triazine which is obtained by trimerization of salicylonitrile or salicylamide or alkyl derivatives thereof.

Examples of the presently useful halogenated tris(hydroxyaryl)-triazines are 2,4,6-tris(2-hydroxy-4-bromophenyl)-s-triazine, 2,4,6-tris(3,5-diodo-2-hydroxyphenyl)-s-triazine, 2,4,6-tris(2-bromo-4-hydroxyphenyl)-s-triazine, 2,4,6 - tris(3,5-dichloro-2-hydroxy-4-methylphenyl)-s-triazine, 2,4,6-tris(4-chloro-2-hydroxy-3-ethylphenyl)-s-triazine, 2,4,6-tris(2,5-dibromo-3-hydroxy-4-pentylphenyl)-s-triazine; 2,4,6 - tris(3,5 - dibromo-2-hydroxy-6-butylphenyl)-s-triazine, etc.

The alkali metal salts of phenols with which the halogenated 2,4,6-tris(hydroxyhaloaryl)-s-triazines are reacted according to the present process are the sodium, potassium, lithium, rubidium or cesium salts of phenol or of the alkyl-substituted phenols, e.g., potassium or lithium o-, m- or p-cresylate, potassium or cerium o-, m- or p-butylphenylate, potassium or sodium, o-, m-, or p-ethylphenylate, sodium or lithium o-, m-, or p-pentylphenylate, etc. The alkali metal salts of the phenoxyphenols or of the alkyl-substituted phenoxyphenols of present utility are, e.g., the sodium, potassium, lithium, rubidium or cesium salts of o-, m- or p-phenoxyphenol, sodium or potassium 2-methyl-4-phenoxyphenylate, potassium or lithium 4-(2-propylphenoxy)phenylate sodium, or rubidium 4-(2-pentylphenoxy)-2-pentylphenylate, etc.

The extent of etherification depends upon the number of replaceable halogen atoms in the 2,4,6-tris(halohydroxyaryl)-s-triazine starting material, i.e., either one or two ether radicals are introduced at the aryl nucleus depending upon whether there is employed a 2,4,6-tris-(monohalohydroxyaryl)-s-triazine or a 2,4,6-tris(dihalohydroxyaryl)-s-triazine. Thus, three moles of potassium phenate react with one mole of 2,4,6-tris(2-hydroxy-4-iodophenyl)-s-triazine to give 2,4,6-tris(2-hydroxy-4-phenoxyphenyl)-s-triazine, six moles sodium p-cresylate react with one mole of 2,4,6-tris(3,5-dibromo-2-hydroxyphenyl)-s-triazine to give 2,4,6-tris(2-hydroxy-3,5-di-p-tolyloxyphenyl)-s-triazine; six moles of lithium or rubidium p-butylphenylate react with one mole of 2,4,6-tris-(3,5 - dibromo - 2 - hydroxy-4-propylphenyl)-s-triazine to give 2,4,6 - tris[3,5 - bis(4-butylphenoxy)-4-propyl-2-hydroxyphenyl]-s-triazine; three moles of sodium or potassium 3-ethylphenylate react with one mole of 2,4,6-tris (3-bromo-2-hydrophenyl)-s-triazine to give 2,4,6-tris[2-hydroxy-3-(ethylphenoxy)phenyl]-s-triazine; three moles of sodium or potassium p-phenoxyphenylate react with one mole of 2,4,6-tris(4-bromo-3-hydroxyphenyl)-s-triazine to give 2,4,6-tris[2-hydroxy-4-(4-phenoxyphenoxy)-phenyl]-s-triazine; six moles of potassium or rubidium 4-(3-isopropylphenoxy)-2-butylphenylate react with one mole of 2,4,6-tris(3,5-dibromo-2-hydroxy-4-ethylphenyl)-s-triazine to give 2,4,6-tris{3,5-bis[4-(3-isopropylphenoxy) - 2 - butylphenoxy]-2-hydroxy-4-ethylphenyl}-s-triazine, etc.

Reaction of the halogenated 2,4,6-(hydroxyaryl)-s-triazine with the alkali metal phenate takes place readily by heating the halogneated compound with the phenate at a temperature of from, say, 150° C. to 240° C. in the presence of an inert diluent or solvent and a heavy metal catalyst, e.g., copper. Advantageously, the reaction is effected at a temperature of from 100° C. to the refluxing temperature of the reaction mixture and in the presence of a copper catalyst which may be, e.g., a finely comminuted metallic copper or a copper salt such as cuprous or cupric iodide, chloride, or bromide.

Since formation of the ethers proceeds by reaction of one mole of the 2,4,6-tris(halohydroxyaryl)-s-triazine with three or six moles of the alkali metal phenate, depending upon the number of halogen atoms in the triazine reactant, the two reactants are advantageously employed in such stoichiometric proportions. An excess of the phenate may be employed, since any unreacted quantity thereof is readily recovered from the reaction product. Use of an excess of the phenate also assures complete reaction of the less readily available triazine reactant. Completion of the etherification reaction can be ascertained by noting cessation of change in the refractive index and/or by sampling of the reaction mixture. The reaction takes place with formation of alkali metal halide as by-product. This can be readily removed from the reaction mixture by filtration and/or water-washing. The desired etherification product is freed from diluent and any unreacted material by isolating procedures known to those skilled in the art, e.g., solvent extraction, fractional crystallization, etc.

The presence of an inert diluent or solvent is advantageous in obtaining smooth reaction and avoiding side reactions, e.g., decomposition and/or polymerization of the triazine reactant. Inert liquid diluents of present utility are polar solvents, generally, e.g., the lower alkyl ethers of ethylene glycol or of diethylene glycol, dioxane, morpholine, pyridine, N,N-dimethylformamide, N,N-dimethylacetamide, dimethyl sulfoxide, etc., as well as the non-polar liquids such as nitrobenzene and high boiling hydrocarbons, which materials while not being solvents for the triazine starting materials are useful in serving to facilitate uniform distribution of the reactants throughout the reaction mixture by suspension. Considering the prerequisites of a solvent or diluent, generally any organic liquid which is non-reactive with either the reactants or the product material may be used.

The presently provided hydroxy ether triazines are stable, well-characterized compounds which range from crystalline to waxy solids and viscous, high-boiling liquids. They are advantageously employed for a variety of industrial and agricultural purposes, e.g., as plasticizers for synthetic resins such as polyvinyl chloride, as antioxidants and curing aids in the manufacture of natural and synthetic rubber products, as gasoline and hydrocarbon oil lubricant additives, as bactericides and fungicides, etc. As disclosed in our copending application Serial No. 123,637, filed of even date, the presently provided hydroxy ether triazines are valuable as starting materials for the synthesis of coordination compounds with bivalent tetracoordinate metals e.g., zinc, nickel, lead, beryllium or copper, which coordination compounds are generally polymeric, moldable and extrudable solids of very good thermal stability.

The invention is further illustrated by, but not limited to, the following examples.

*Example 1*

2,4,6-tris(2-hydroxy-3,5-dibromophenyl)-s-triazine was prepared by bromination of 2,4,6-tris(2-hydroxyphenyl)-s-triazine with excess bromine and using no solvent. After crystallization from N,N-dimethylformamide, the yellow solid melted at 355° C., as reported by Lindemann (Ann., 449, 73 (1929)).

Potassium phenate was prepared by heating a mixture of 50 g. of phenol and 14 g. of 85% potassium hydroxide pellets in toluene until water was completely removed, and then distilling off the toluene.

Powdered copper, to be employed as catalyst for reaction of the tripotassium salt with the potassium phenate was prepared as follows: A slightly acidified solution of copper sulfate was treated with oxide-free zinc dust while maintaining the temperature at below 40° C., the copper thus precipitated was collected, washed acid-free with water and then with acetone, and finally dried at about 100° C., substantially as described by P. H. Gore and G. K. Hughes, J. Chem. Soc. (1959), 1615.

A mixture consisting of the above-prepared potassium phenate, 13 g. of the copper catalyst prepared above and 30 ml. of diglyme solvent was heated to 165–185° C. under nitrogen and 13 g. of the above-prepared 2,4,6-tris(2-hydroxy-3,5-dibromophenyl)-s-triazine was added to the hot mixture over an hour with rapid stirring. The resulting reaction mixture was heated overnight at 200° C., and finally for 3 hours at 230° C. It was then cooled and filtered. The filtered solid was washed with toluene, the toluene washings were combined with the filtrate, and the combined material was washed with dilute hydrochloric acid and twice with water and finally dried over magnesium sulfate. Concentration almost to dryness and trituration with ethanol gave the yellow, solid 2,4,6 - tris(3,5 - diphenoxy - 2-hydroxyphenyl)-s-triazine, M.P. ca. 195–198° C., and analyzing as follows:

|  | Found | Calc. for $C_{57}H_{39}N_3O_9$ |
| --- | --- | --- |
| Percent C | 75.4 | 75.2 |
| Percent H | 4.4 | 4.32 |
| Percent N | 4.5 | 4.62 |

The zinc chelate of the 2,4,6-tris(3,5-diphenoxy-2-hydroxyphenyl)-s-triazine was prepared as follows: To 1 g. of the triazine dissolved in 5 ml. of warm benzene there was added 362 mg. of zinc acetate dihydrate dissolved in 30 ml. of absolute ethanol. A copious, brownish-yellow precipitate appeared immediately. After digesting the reaction mixture for 15 minutes on the hot plate, the solid was filtered on the Büchner funnel, washed twice with warm ethanol, and dried to give the substantially pure chelate, M.P. 320–330° C., and analyzing 8.71% zinc. The calculated value for the zinc content of a polymeric zinc chelate compound such as the chelate of 2,4,6-tris (3,5-diphenoxy-2-hydroxyphenyl)-s-triazine wherein zinc is at each of the 3 coordination sites, i.e., having 1.5 atoms of zinc per triazine, is 9.75%.

The above prepared zinc chelate was mixed in a 1:1 ratio with the similarly prepared zinc chelate of 2,4,6-tris(2-hydroxyphenyl)-s-triazine and the mixture was molded in a high pressure molding apparatus at a pressure of 8900 kg./cm.$^2$ and a temperature of up to 350° C. The apparatus was allowed to cool under pressure. The molded product was a hard, shiny brown disc, 0.25 mm. thick.

The zinc chelate of this example, i.e., of 2,4,6-tris-3,5-diphenoxy-2-hydroxyphenyl)-s-triazine was also used in a molding procedure calculated to give in situ, a molded product consisting of said diphenoxy compound and the chelate of 2,4,6-tris(2-hydroxyphenyl)-s-triazine. In this experiment, the zinc chelate of the diphenoxy compound was mixed with salicyclonitrile and with 3 times the quantity of zinc oxide calculated to give the chelate of 2,4,6-tris(2-hydroxyphenyl)-s-triazine the excess of zinc oxide being employed for the purpose of effecting bonding between the 2 different chelates. The thoroughly ground mixture was molded in the high pressure apparatus at 12,700 kg./cm.$^2$ of pressure and a temperature of 250° C. Under these conditions, the salicyclonitrile trimerized to the 2,4,6-tris(2-hydroxyphenyl)-s-triazine, and the zinc oxide reacted with the latter to form its zinc chelate. The molded product was a coherent, smooth disc which was resistant to hot acetone.

*Example 2*

A mixture consisting of 60 g. of m-phenoxyphenol and 20 g. of 85% potassium hydroxide pellets in 50 ml. of toluene was heated until all the water was removed. Freshly prepared copper catalyst (8.3 g.), prepared as in Example 1, was then added to the resulting phenate and the toluene distilled off. The residue was heated under nitrogen to 130° C., and 8.31 g. (0.01 mole) of 2,4,6-tris(2-hydroxy-3,5-dibromophenyl)-s-triazine was added thereto over an hour period, with rapid stirring. The whole was then heated for 5 hours under nitrogen at 240–250° C. (oil bath temperature) while continuing the rapid stirring. After being allowed to cool overnight, the resulting deep, red-brown, solid mass was dissolved in hot diglyme and filtered to remove copper catalyst. The filtered catalyst was washed with diglyme and the washings were added to the filtrate. The combined material was washed once with dilute hydrochloric acid, twice with water, and finally dried over anhydrous magnesium sulfate. Distillation of the dried product to remove material boiling below 155° C./1.8–2.0 mm., gave as residue the substantially pure 2,4,6-tris[2-hydroxy-3,5-bis(3-phenoxyphenoxy)phenyl]-s-triazine.

What we claim is:
1. A compound of the formula

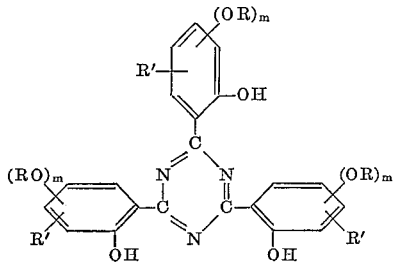

wherein R' is selected from the class consisting of hydrogen and alkyl of from 1 to 5 carbon atoms, R is selected from the class consisting of phenyl, phenoxyphenyl, alkyl-substituted phenyl and alkyl-substituted phenoxyphenyl wherein alkyl has from 1 to 5 carbon atoms, and $m$ is a number of from 1 to 2.

2. 2,4,6 - tris[2 - hydroxy(diphenoxy)phenyl] - s - triazine.

3. 2,4,6 - tris[2 - hydroxy - bis(phenoxyphenoxy) - phenyl]-s-triazine.

4. 2,4,6 - tris(3,5 - diphenoxy - 2 - hydroxyphenyl)-s-triazine.

5. 2,4,6 - tris[2 - hydroxy - 3,5 - bis(3 - phenoxyphenoxy)phenyl]-s-triazine.

References Cited in the file of this patent

Lindermann et al.: "Annalen der Chemie," volume 449, page 73, 1926.

Weygand: "Organic Preparations," Interscience Pub. Inc., 1945, page 165.